United States Patent [19]
Mehring et al.

[11] Patent Number: 5,590,286
[45] Date of Patent: Dec. 31, 1996

[54] METHOD AND APPARATUS FOR THE PIPELINING OF DATA DURING DIRECT MEMORY ACCESSES

[75] Inventors: Peter A. Mehring, Sunnyvale; Cau L. Nguyen, Milpitas, both of Calif.

[73] Assignee: Sun Microsystems, Inc., Mountain View, Calif.

[21] Appl. No.: 131,970

[22] Filed: Oct. 7, 1993

[51] Int. Cl.$^6$ .................................................. G06F 13/38
[52] U.S. Cl. ..................... 395/250; 395/500; 364/DIG. 1
[58] Field of Search ...................................... 395/250, 500

[56] References Cited

U.S. PATENT DOCUMENTS

| | | | |
|---|---|---|---|
| 4,716,525 | 12/1987 | Gilanyi et al. ............................ | 395/250 |
| 5,134,699 | 7/1992 | Aria et al. ................................. | 395/425 |
| 5,146,582 | 9/1992 | Begun ....................................... | 395/500 |
| 5,363,485 | 11/1994 | Nguyen et al. ........................... | 395/250 |
| 5,430,849 | 7/1995 | Banks ....................................... | 395/250 |
| 5,440,751 | 8/1995 | Santeler et al. .......................... | 395/800 |
| 5,455,913 | 10/1995 | Schrock et al. .......................... | 395/280 |

*Primary Examiner*—William M. Treat
*Attorney, Agent, or Firm*—Blakely Sokoloff Taylor & Zafman

[57] ABSTRACT

A method and apparatus for the pipelining of data during direct memory accesses. The processor includes an external bus controller, which receives data transmitted across the external bus from an external device, and forwards the data onto the memory bus for transfer to the memory. Similarly, the bus controller receives data to be written to external device from the memory and transfers it across the external bus to the external device. The bus controller includes logic to detect burst transfers and word alignment to determine the minimum number of words that can be transferred across the memory bus while the data transfer from the external device is ongoing. Therefore, instead of waiting for the entire block of data to be received into the processor before transferring it to the memory, portions of the block transferred, for example, two words at a time, are transferred to the memory, while additional data is being received at the processor. If two words are transferred at a time across the memory bus, then at the end of a block transfer only one additional cycle is required to transfer the last two words of data to the memory. Similarly, for a write operation to the external device, data can be piecewise transferred across the slower external bus as it is received in the bus controller in order to minimize the time required to complete the transfer.

17 Claims, 8 Drawing Sheets

METHOD AND APPARATUS FOR THE PIPELINING OF DATA DURING DIRECT MEMORY ACCESSES

BACKGROUND OF THE INVENTION

1. Field of the Invention

The present invention relates to the field of direct memory transfers, specifically transfers across memory bus and a slower, external peripheral bus.

2. Art Background

As electronic technology improves, more and more elements are put on a single component. For example, on a processor component, it is desirable to include memory as well as other processor-supporting elements on the same component in order to take advantage of the high speed component-level interconnect available, as well as to minimize the amount of space required to implement the functionality. Thus, many of today's processor components, such as central processing units (CPU), can operate at extremely high speeds. However, the overall bandwidth of the system which includes the CPU is often limited by the speed of the external interconnect. Although specially designed memory busses typically operate on the processor clock, general purpose I/O busses cannot operate as fast. The external interconnect, for example, an I/O bus, can be three to five times slower than the intra-component buses. For example, one I/O bus, IEEE P1496 specification, is defined to support frequencies from 16.7 MHz to 25 MHz. Processor designs today start at 50 MHz and extend well above 100 MHz.

SUMMARY OF THE INVENTION

It is an object of the present invention to provide a pipelining method and apparatus for increasing throughput of direct memory access operations.

In the system of the present invention, a processor device, such as a central processing unit (CPU) is coupled through an external bus to external devices through an external general purpose input/output (I/O) bus. The CPU is also coupled to memory, such as DRAM through a high speed memory bus. The external bus operates at a first clock, and the memory bus runs at a second clock, faster than the external bus clock. Data transfers between devices coupled to the external bus and the memory of the processor is dependent upon the speed of the external bus. In the system of the present invention, the pipelining of data transferred from and to the processor is performed in order to minimize the detrimental effect of the lower external bus speed, and increase throughput of the processor.

The processor includes an external bus controller, which receives data transmitted across the external bus, and forwards the data onto the memory bus for transfer to the memory. Similarly, the bus controller receives data to be written to devices coupled to the external bus from the memory of the processor and transfers it across the external bus to the external devices. The bus controller includes logic to detect burst transfers and word alignment to determine the minimum number of words that can be transferred across the memory bus while the data transfer from the external device is ongoing. Therefore, instead of waiting for the entire block of data to be received into the processor before transferring it to the processor memory, portions of the block transferred, for example, two words at a time are transferred to the memory, while additional data is being received at the interface.

If two words are transferred at a time across the memory bus, then at the end of a block transfer only one additional cycle is required to transfer the last two words of data to the memory. Similarly, for a write operation to an external device, data can be piecewise transferred across the slower external bus as it is received in the bus controller in order to minimize the time required to complete the transfer.

The pipelining of data within a single transfer takes advantage of the fact that the memory bus operates at a higher clock speed than the external bus, and therefore, the subtransfers across the memory bus can be accomplished within one clock cycle of the slower external bus. This is particularly applicable to DMA transfers when a memory is external to the processor. In one embodiment, data coming across the external bus from the DMA device is grouped into word pairs and buffered internally. Once captured internally, the data is burst out onto the faster memory bus, in a single memory write transaction. Thus, by the time the last word pair is received in the processor at the external bus controller, only one double word write operation is performed instead of a multiple word burst transfer.

BRIEF DESCRIPTION OF THE DRAWINGS

The objects, features and advantages of the present invention will be apparent to one skilled in the art from the following detailed description in which.

DETAILED DESCRIPTION OF THE INVENTION

In the following description, for purposes of explanation, numerous details are set forth in order to provide a thorough understanding of the present invention. However, it will be apparent to one skilled in the art that these specific details are not required in order to practice the present invention. In other instances, well-known electrical structures and circuits are shown in block diagram form in order not to not obscure the present invention unnecessarily.

Figure 1:
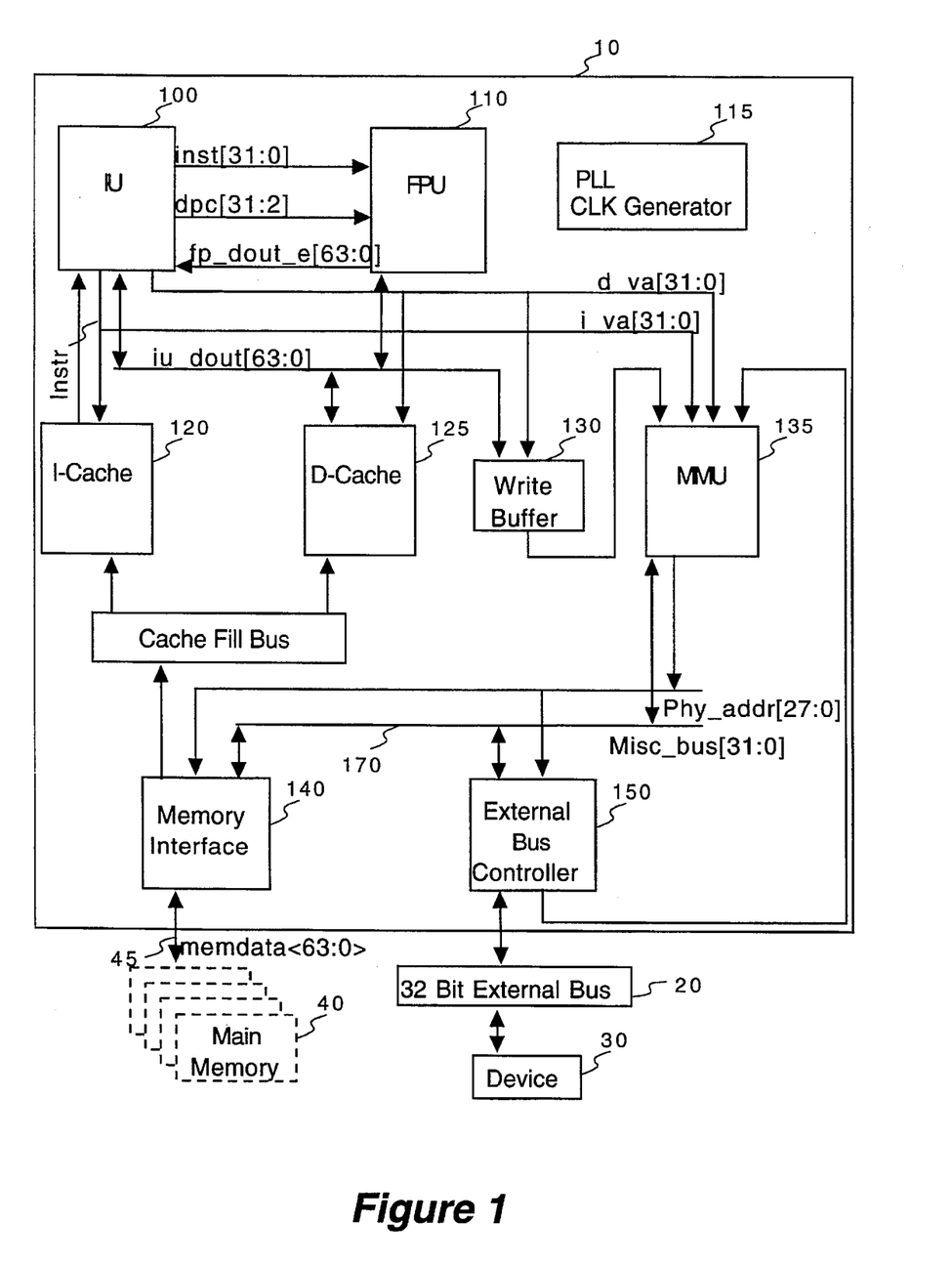
FIG. 1 is a block diagram of one embodiment of the processor which implements the method and apparatus of the present invention.

The present invention provides an apparatus and method for improving bandwidth of data accesses to main memory from an external device, and therefore improving the overall throughput of the processor. A block diagram of a system utilizing the concepts and teachings of the present invention is shown in FIG. 1. It is readily apparent that the processor's architecture is exemplary and different architectures may be utilized and still perform the teachings of the present invention. A processor unit 10, such as a CPU, typically includes a processing component 100 such as an instruction unit and floating point unit. The processor unit 10 is coupled to an external bus 20, such as the I/O Bus described by IEEE P1496 Standard, and supported by a number of manufacturers, including Sun Microsystems, Inc., Mountain View, Calif. Other devices and components may be coupled to the bus 20 such as an I/O device 30.

A high speed memory bus 45 is also coupled to the CPU 10 to provide a high speed data path between memory and the CPU. The memory interface 140 communicates data between main memory 40 and the processor 10, as controlled by the memory management unit (MMU) 135. In the embodiment described, memory 40 is a random access memory which can function as a DMA (Direct Memory Access) device. The external device 30 is a bus master device, such as an Ethernet controller, SCSI controller or intelligent video frame buffer, through which direct memory access operations to the memory 40 are performed. An external bus controller 150, communicates data between the processor 10 and the external bus 20. The external bus 20 operates at a slower clock speed, for example, three to five times slower than the memory bus of the processor unit 10. The slower clock speed is taken advantage of by pipelining the data transfers to be performed between the memory 40 and the processor unit 10.

In the prior art, block data transfers are performed by transferring the complete block from one location to another, for example, from the external memory device 30 to the processor, and, upon receipt of the block at the processor 10, particularly the external bus controller 150, transferring the block to the memory 40. Thus, before data can be transferred to the memory 40, the entire block of data would have to be received at the external bus controller 150. The time delay incurred by waiting for the transfer from the external bus 155 to the bus controller is compounded by the slower clock speed of the external bus. Therefore, if the memory bus operates three to five times faster than the external bus, the latency is multiplied by that amount.

Figure 2A:
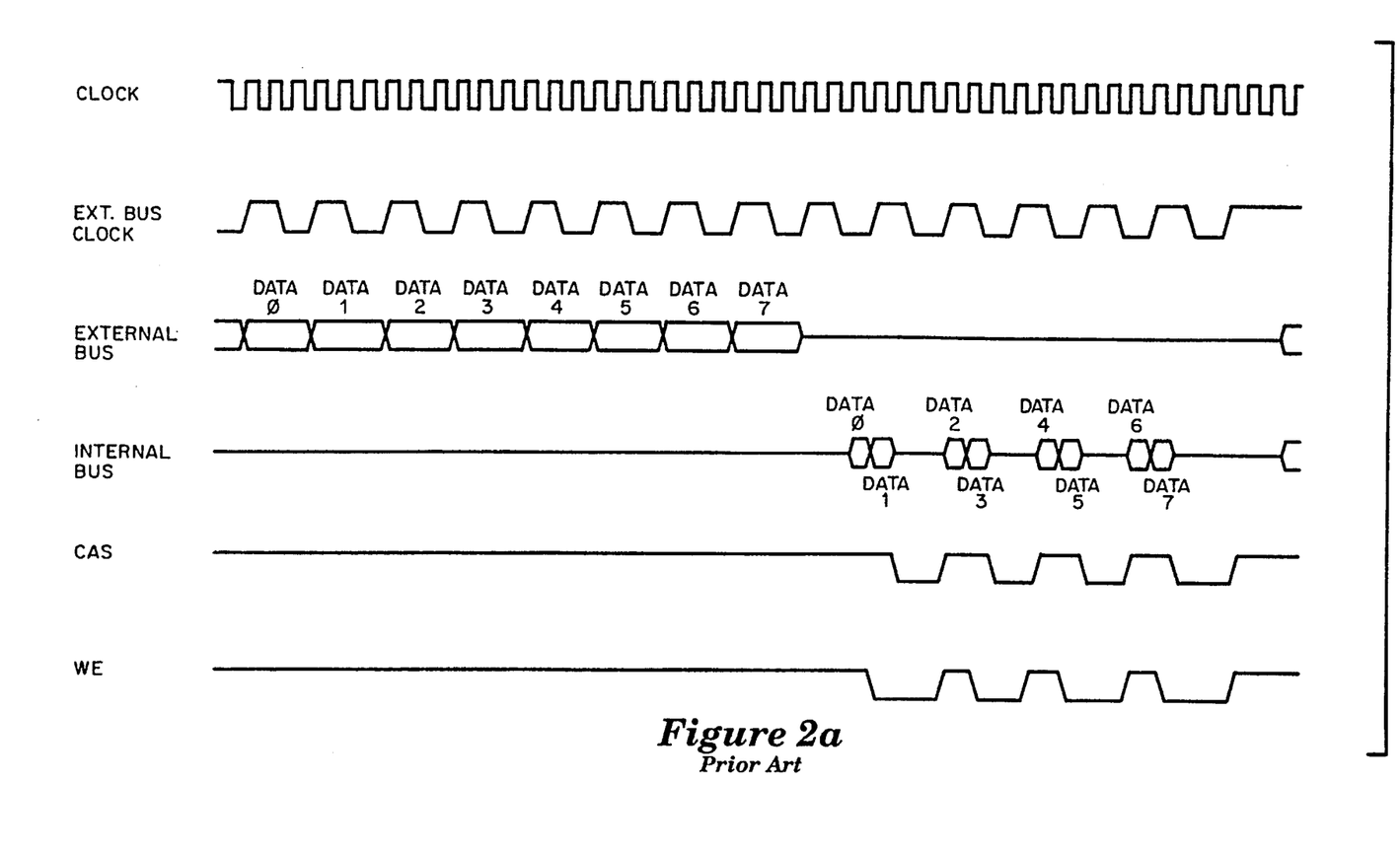
FIG. 2a is a timing diagram illustrating prior art write accesses.

Referring to FIG. 2a, the timing for a prior art write transaction is shown. In the present illustration, the CPU clock (clock) operates at three times the speed of the external bus clock. In accordance with the bus protocol of the present embodiment, a word of data is transferred across the external bus to the external bus controller of the CPU once every external bus clock. As can be seen in FIG. 2a, the data is not transferred across the internal bus to the memory interface and memory until after the entire burst has been transferred across the external bus to the bus controller.

Figure 2B:
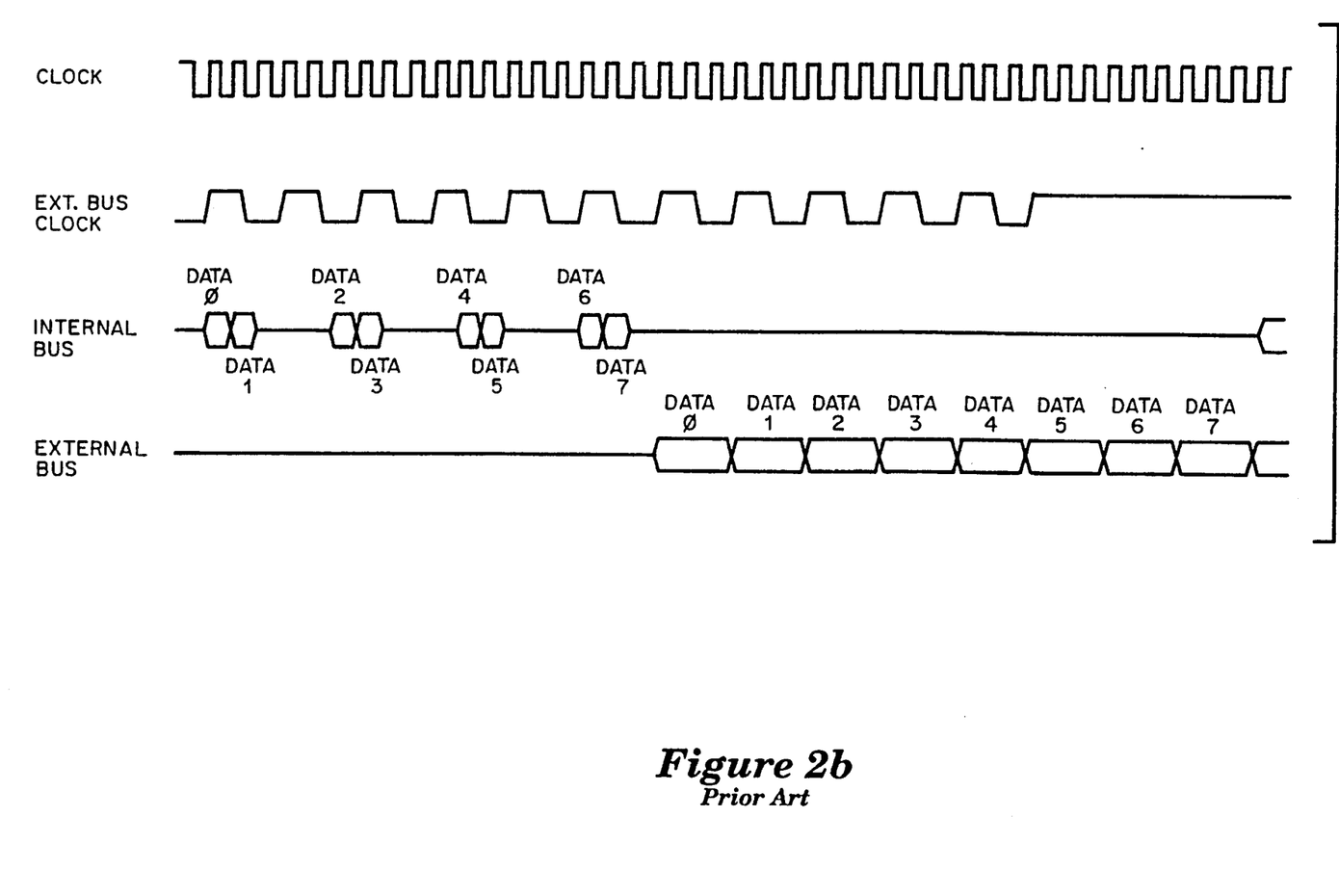
FIG. 2b is a timing diagram illustrating prior art read accesses.

Similarly, for a read operation of the memory 40 by the external device 30, the data to be written to the external device 30 is accumulated in registers in the bus controller 150. Once the complete block of information is located in the bus controller 150, it is transferred out at the slower external bus clock speed to the device 30. FIG. 2b shows the timing for prior art read pipelining. Referring to FIG. 2b, the data is not transferred across the external bus to the device until the transfer across the internal bus to the bus controller is complete.

In the present embodiment, the external bus transfers data in accordance with the protocols set forth in the IEEE specification no. 1496, in which burst transfers of data are performed by transferring one word of data every clock cycle of the external bus. This corresponds, typically, to three internal clock cycles and faster memory speeds. Thus, to take advantage of the difference in clock cycle speeds and faster memory speeds, data received from the external device 30 into the external bus controller is grouped into sub-burst blocks. Preferably the data is grouped into word pairs as in the present embodiment the memory bus 45 is twice as wide as the external bus 20. Thus, once two words of a multi-word burst are captured internally in the controller 150, the data is then burst out locally across a bus 170 to the memory interface 140 and main memory 40 as a single memory write transaction.

This transfer to memory is performed while receiving the next data word from the external bus 20. As the processor's internal clock and therefore the clock of the memory bus is much faster than the external bus clock, these internal burst operations can be performed without affecting the ongoing data transfer from the external device to the processor. Therefore, by the time the last word pair is received by the external bus controller 150, only one double word write operation needs to be performed to the memory. The wait required for the eight words of data to be transferred from the external device 30, and the time required to perform an eight word burst across the memory bus 45 is minimized. It has been found that an overall improvement in DMA bandwidth of up to 30 percent is realized by pipelining the data in this manner.

Similarly, for a read operation, the first two words received by the bus controller 150 from main memory 40 are immediately transferred across the external bus while receipt of the subsequent words of the burst is ongoing. Thus, the controller 150 does not wait for the entire eight words to be received from memory prior to transferring the data out onto the external bus 20.

Preferably, the process includes a check to determine whether the address received is aligned or unaligned. Unaligned data transfers are supported by the embodiment of the external bus described herein. The protocol allows data to be transferred out of order for unaligned address (requiring the swapping of words internally). Due to this possibility, unaligned data must typically be completely read before transferring to memory. In the present embodiment, however, if an unaligned address is received, the external bus controller will automatically break the unaligned burst transfer down into aligned transmissions. For example, if the burst transfer is quad word aligned and the burst consists of a total of eight words, the transfer is broken down into double word aligned transfers, and the data is transferred accordingly to the main memory 40. Preferably, this is accomplished by performing a check of a predetermined number of least significant bits of the addresses of incoming data. For example, if the 3 least significant bits are equal to 000, the transfer is 8 word aligned; if the 2 least significant bits are equal to 00, the transfer is quad-word aligned.

Figure 3A:
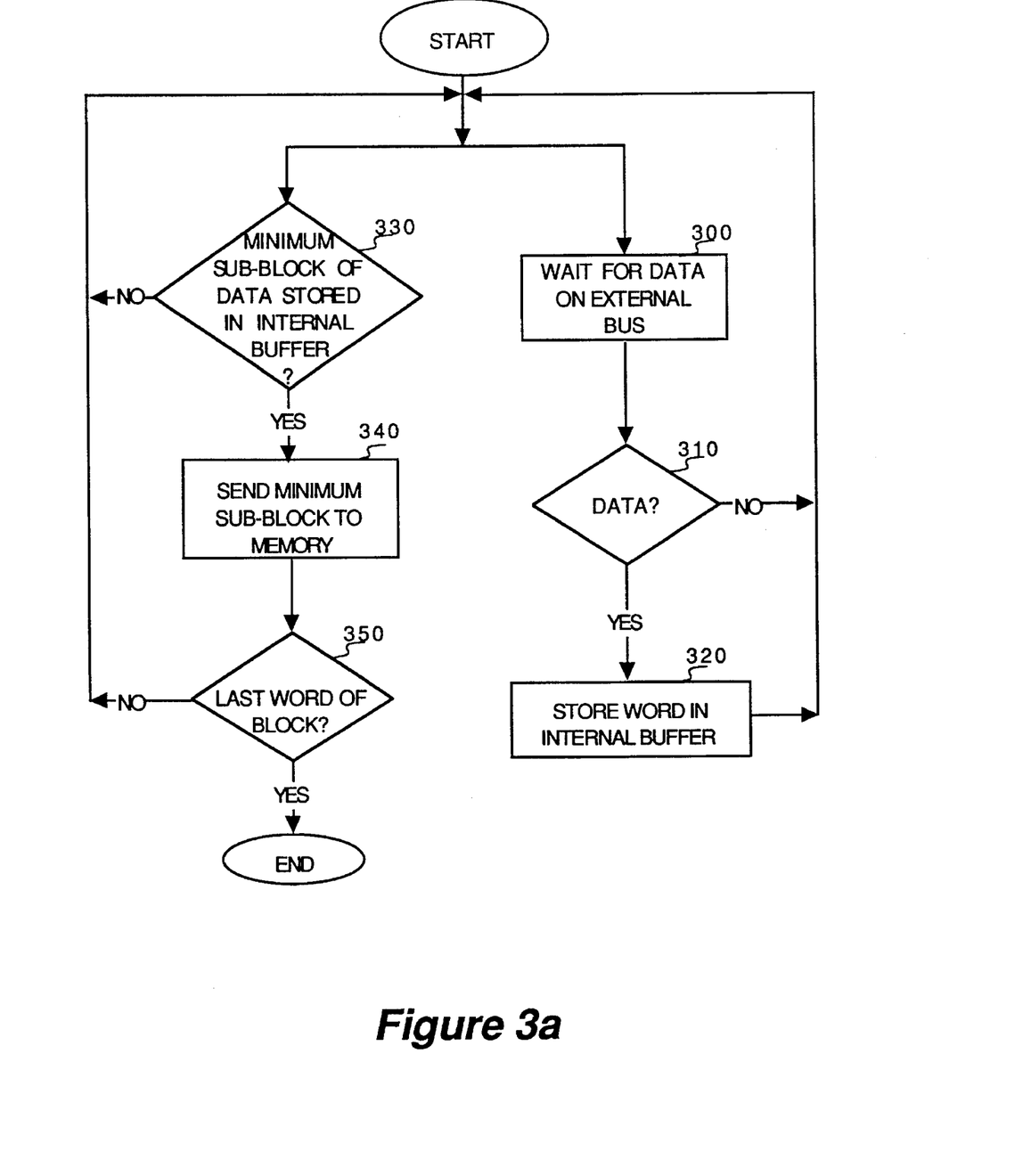
FIG. 3a is a block diagram illustrating generally one embodiment for performing a read operation into internal memory in accordance the teachings of the present invention.

The overall process can be generally explained with reference to the flow charts of FIG. 3a and FIG. 3b. FIG. 3a illustrates a direct memory access write pipeline process. In this process, data is transferred from the external device to memory of the processor. At step 300 the bus controller waits for data to be transmitted by the external device across the external bus. When data is received, step 310, the word received is stored in an internal buffer in the bus controller, step 320. In accordance with the specification used in the preferred embodiment, one word of data is transferred every external clock cycle during a burst cycle and the storage of the data in the buffer is performed at the faster clock of the processor.

Concurrently, with steps 300, 310, 320, portions of the block are transferred to the memory in order to increase the throughput of the transaction. In particular, at step 330, the number of words stored in the internal buffer of the bus controller is compared to the minimum block transfer size for the memory bus. In the present illustration, the minimum number of words is two, therefore, once two words have been received and stored in the internal buffer of the bus controller, a transfer to memory is performed. The words are sent across the memory bus to the memory interface at the next internal (i.e. processor) clock cycle. As the processor clock is faster than the external clock, this transfer from the internal buffer to memory occurs before the next word is received by the bus controller. If additional words are to be received by the bus controller step 350, the processing continues at steps 300 and 330 until all the data of the block transfer is received. Thus, the transfer internally will be complete soon after the transfer from the external device with the minimum amount of latency incurred.

Similarly, advantage can be taken of the differing clock speeds for performance of a read burst transaction. The processes explained generally with respect to FIG. 3b. In a read transaction, data is transferred from the main memory to the external device, and, as the transfer between main memory and the external bus controller can be performed at the faster clock rate, the read operation can be initiated on the external bus while the transaction is still executing internally between the memory and the bus controller.

Figure 3B:
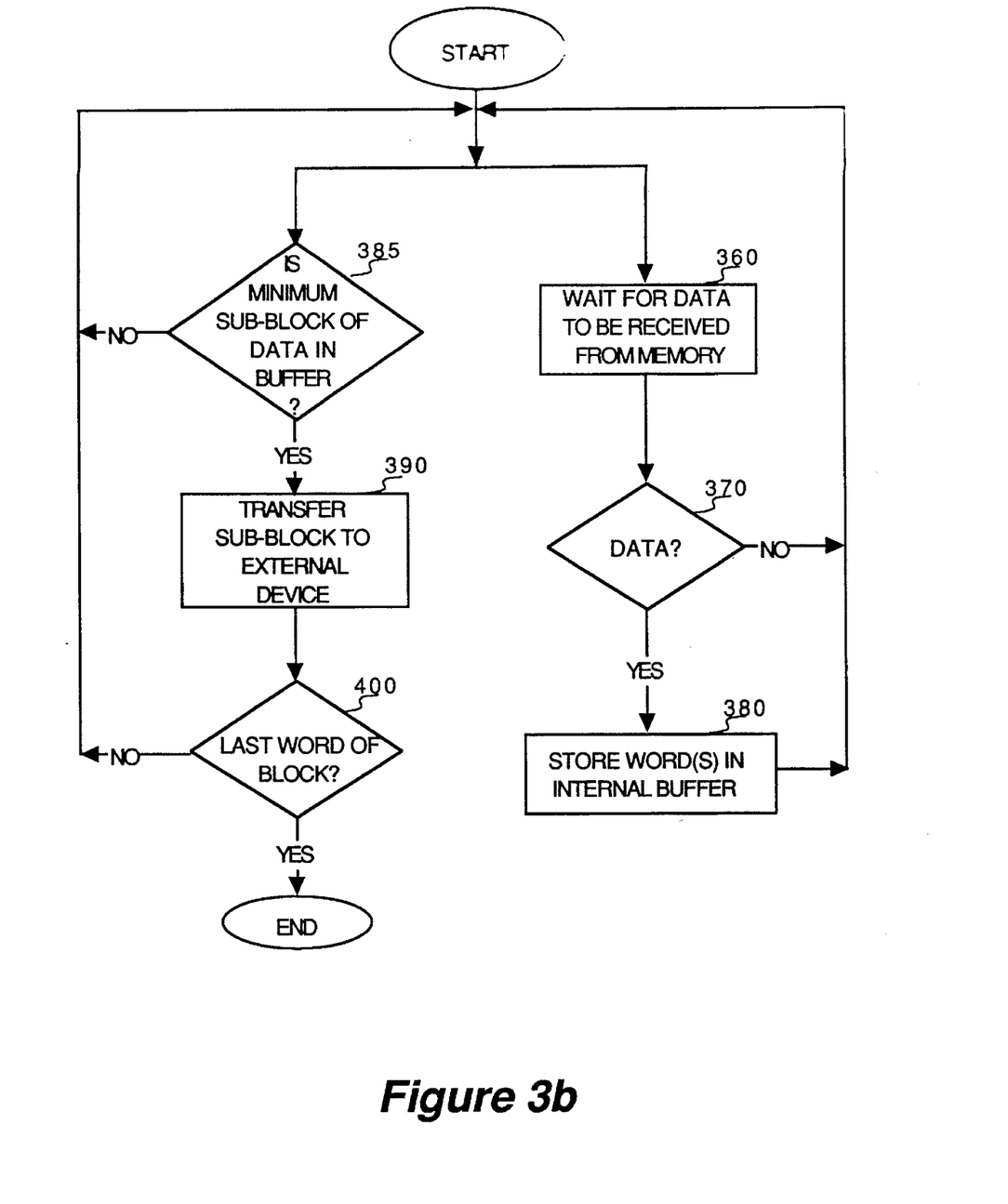
FIG. 3b is a flow diagram illustrating a write operation performed in accordance with the teachings of the present invention.

Referring to FIG. 3b, at step 360, the controller waits for data to be received from the main memory. This data can be received in multiple word transfers, such as two-word per block transfers. Once data is received, step 370, the words are stored in the internal buffer of the bus controller, step 380, at the slower clock speed corresponding to the external bus clock. At step 390, the data is transferred at the clock speed of the external bus to the external device. Concurrently, the controller waits for the next block of data to be received, step 360. As the clock speed of the external bus is much slower than that of the internal memory bus, the sub-block transfer can be initiated on the external bus while still acquiring the data from the main memory across the memory bus. The process continues until the last word of the block transferred to the external device is received, step 400. Therefore, the minimum number of "extra" clock cycles required on the external bus, beyond the corresponding number of clock cycles required to transfer data to the controller, to perform the transfer is minimized.

Figure 4:
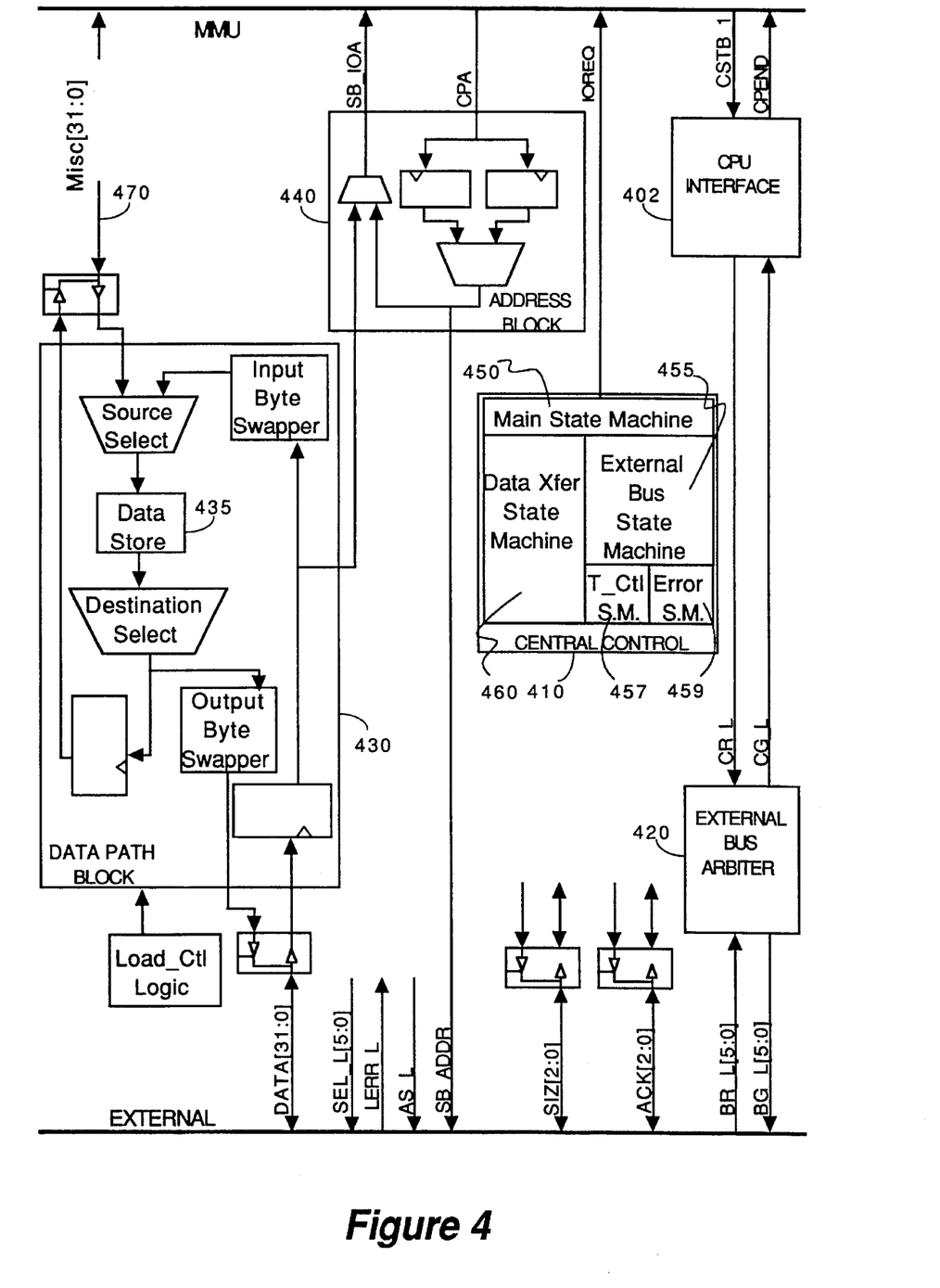
FIG. 4 is an exemplary block diagram of the bus controller utilized to perform data pipelining in accordance with the teachings of the present invention.

To provide this capability, in the present embodiment, the external bus controller is modified to provide for the direct memory access pipelining in accordance with the teachings of the present invention. A block diagram of the controller is shown in FIG. 4. The controller includes a CPU interface 400, a central controller 410, an external bus arbiter 420, data path block 430, and address block 440. The CPU interface 400 functions to interface the external bus controller to the instruction unit and floating point unit of the processor. The central controller 410 preferably includes a main state machine 450, an external bus state machine 455 and a data transfer state machine 460 to control the transfer of data to and from the external bus. Preferably, the data transfer state machine 460 and external bus state machine 455 function as counters to monitor the data transferred to/from the memory and to/from the external bus, respectively. In the present embodiment, the central controller 410 also includes a T-Ctl state machine 457, which monitors acknowledgment of data transfers across the external bus and an error state machine 459 which monitors and reports errors which occur in the data. The data transfer state machine 460, external bus state machine 455, T-Ctl state machine 457 and error state machine 459 support the main state machine 450. The data path block 430 receives the data and buffers the data specifically in the data store 435, between the external bus and the memory. The address block 440 transmits the addresses corresponding to the data transferred between the external device and the memory management unit. The arbiter 420 performs the arbitration of access on the external bus.

The state machines of the central control block 410 monitor the data received into the data path block and issues an I/O request signal to the MMU when data has been received. Thus, in the present embodiment, if a block transfer is to be performed after two words of data have been received into the data path block 430, an I/O request signal, for example a memory write operation, is issued by the central controller 410 to the MMU. The data in the data path block 430 is then output onto the internal bus 470 under control of the MMU for transfer to the main memory through the memory interface.

The address block 440 determines how the addresses of the block transfer are aligned. The central controller 410, based upon the alignment of the data determined, timely issues memory requests to the memory management unit, such that the memory sub-transactions are initiated and completed prior to completion of the corresponding burst transaction on the external bus. The central controller 410 issues the memory request to the MMU in accordance with the faster clock of the CPU and transfers data to and from the external bus controller via the data path block 430 at a clock rate corresponding to the clock of the external bus. The data however gets buffered internally in the data path block 430 on the CPU clock and is transferred prior to the occurrence of the next external bus clock.

Therefore, the step of latching the data off of the external bus is performed at the slower clock corresponding to the clock of the external bus. The other steps of the read and write processes are performed at the speed of the faster clock. Furthermore, during a read operation, the steps of accessing the memory, transferring data from the memory to the bus controller and placing the read data at the output ports of the controller are performed at the faster clock speed. The data is then held at the I/O ports to the external bus until the next clock edge of the slower clock occurs, at which time data is transferred across the external bus to the receiving device. By performing these steps at the faster clock and modifying the steps for transferring data, the performance is increased by decreasing the latency incurred during read and write transactions.

Figure 5A:
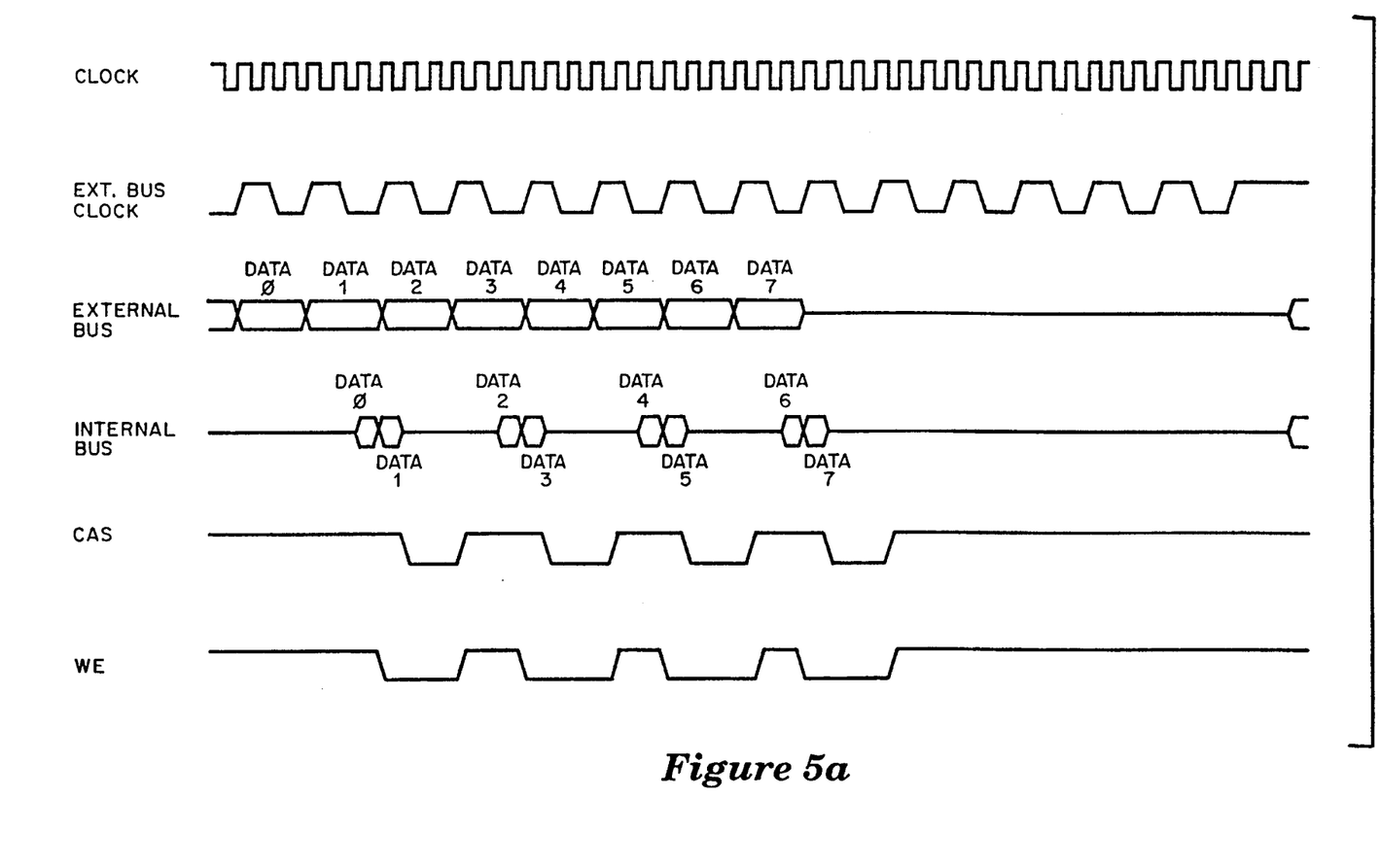
FIG. 5a is a timing diagram illustrating the pipelining of write data in accordance with the teachings of the present invention.
Figure 5B:
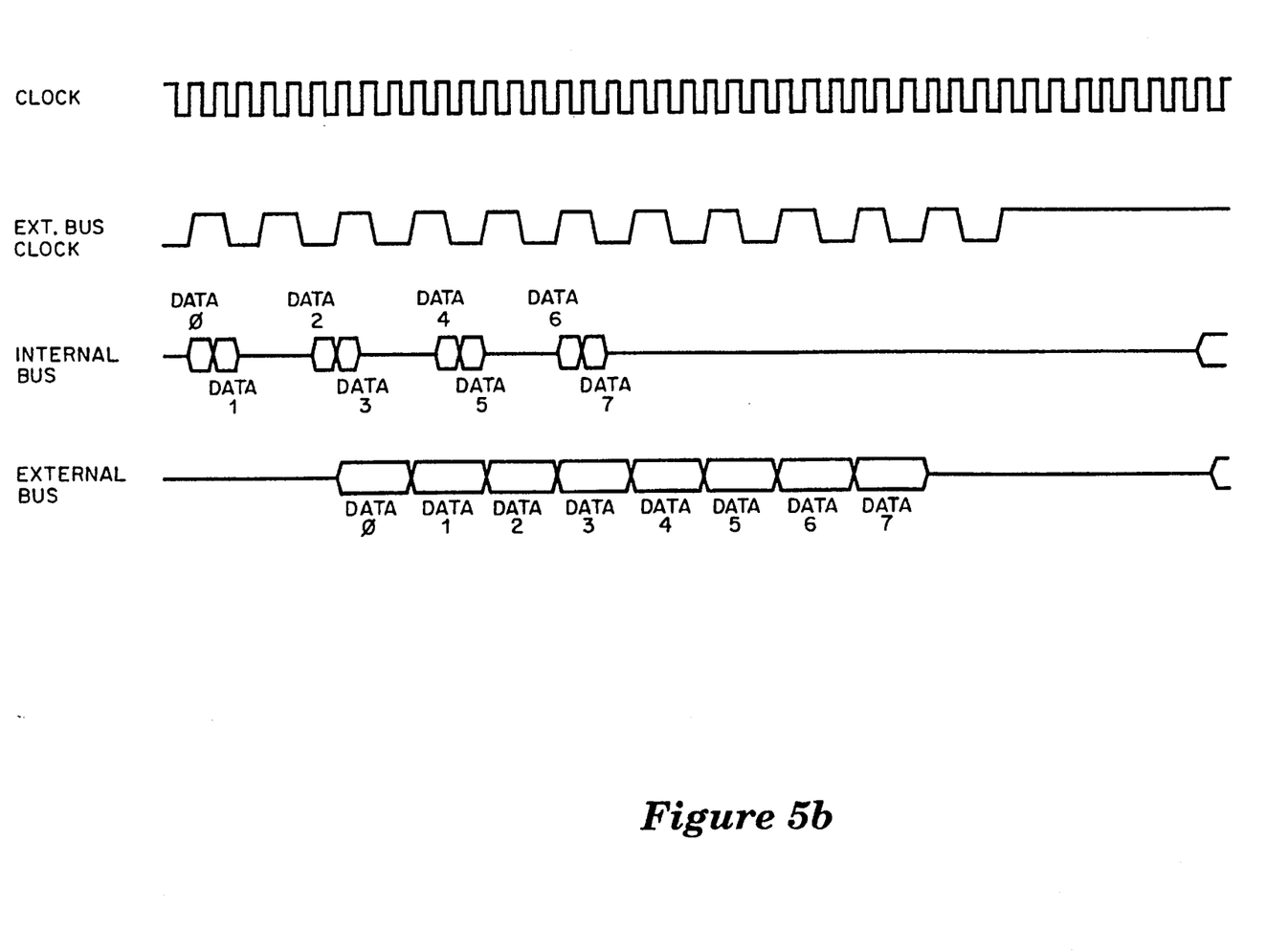
FIG. 5b is a timing diagram illustrating the pipelining of read data in accordance with the teachings of the present invention.

The advantages achieved may best be visualized with respect to the timing diagrams of FIGS. 5a and 5b. Referring to the timing diagram of FIG. 5a, in which burst write transactions are performed in accordance with the teachings of the present invention, data is still received by the bus controller at the slower clock speed of the external bus. However, at the internal clock signal (clock) which occurs immediately after the falling edge of the external bus clock (signifying the completion of the transfer of data from the external bus to the bus controller), the data is transferred onto the internal bus in four two-word sub-transactions to the memory interface and external memory. Thus, by the time the eighth word of data is received, six of the eight data words have been written to main memory, thus only two words remain to be transferred to the memory. This results in an increase of performance of up to 30% with an average performance increase of 8.5%.

Referring to FIG. 5b, which illustrates the timing for a read transaction, the transfer across the external bus is initiated after the first two data words are received. As the transfer across the internal bus is much faster than the external bus transfers, the external bus burst transaction can be initiated before the data transfer to the bus controller is complete. By performing read transfers in this pipelined manner, an average of an 8% performance increase with a peak performance increase of 29% is achieved.

The invention has been described in conjunction with the preferred embodiment. It is evident that numerous alternatives, modifications, variations and uses will be apparent to those skilled in the art in light of the foregoing description.

What is claimed is:

1. In a system comprising a processor component coupled to an external bus, and an external device coupled to the external bus, an apparatus for transferring data from the external device across the external bus to main memory coupled to the processor component by a high speed memory bus, said external bus operating at a first clock speed and said memory bus operating at a second clock speed faster than the first clock speed, said apparatus comprising:

an external bus controller coupled to the memory bus and the external bus for communicating data between the processor component and the external device coupled to the external bus, said bus controller communicating data across the external bus at the speed of the first clock and communicating data across the memory bus at the speed of the second clock, said external controller comprising;

a buffer for temporarily storing data communicated from/to the external device pursuant to a write/read operation to be performed, said data stored in the buffer in accordance with the speed of the second clock, a first communication path for communicating data between the external bus controller and the external bus at the rate of the first clock, a second communication path for causing the communication of data between the buffer and the memory bus at the rate of the second clock, a transfer controller which detects a determined number of words stored in the buffer and causes the completion of the operation with respect to the buffered data while the remaining data to be transferred pursuant to the operation is transferred to the buffer;

wherein said external bus controller continues to buffer remaining data of the operation and complete the operation with respect to the buffered data such that delay incurred by waiting for the data to be communicated to the external bus controller prior to transferring the data to complete the operation is minimized.

2. The apparatus as set forth in claim 1, wherein if said operation is a memory write operation in which data is transferred from the external device and written into main memory, said transfer controller issuing a memory write signal to a memory controller to cause the transfer of the data located in the buffer to the memory when a determined number of words are detected, said memory controller operating at the first clock speed.

3. The apparatus as set forth in claim 1, wherein if said operation is a memory read operation in which data is transferred from the main memory to the external device, said transfer controller transferring the data located in the buffer across the external bus to the external device at the speed of the first clock.

4. The apparatus as set forth in claim 1, further comprising an address alignment detector for determining address alignment of data to be transferred between memory and the external device.

5. The apparatus as set forth in claim 4, wherein the determined number of words stored in the buffer prior to transfer of the data from the buffer to complete the operation with respect to the buffered data is determined according to the address alignment detected.

6. The apparatus as set forth in claim 2, wherein data is transferred across the external bus in blocks of eight words, one word transferred per clock cycle, said transfer controller issuing a memory write signal to the memory controller when two words are detected to be stored in the buffer;

wherein data is transferred to memory as the data is received across the external bus such that only two words are transferred to memory after transfer across the external bus is complete.

7. The apparatus as set forth in claim 3, wherein data is received from memory and stored in the buffer according to the first clock and a bus transfer to transfer the data across the external bus to the external device is initiated once two words are stored in the buffer, wherein data is transferred to the external device as received in the buffer.

8. In a system comprising a processor coupled to an external bus, and an external device coupled to the external bus, a method for transferring data between the external device across the external bus and main memory coupled to the processor by a high speed memory bus, said communication pursuant to a write operation to be performed, said external bus operating at a first clock speed and said memory bus operating at a second clock speed faster than the first clock speed of the external bus, said method comprising the steps of:

transferring data from the external device to be written to memory across the external bus at the speed of the first clock;

temporarily storing data transferred from the external device, said data stored in a buffer in accordance with the speed of the second clock;

detecting a determined number of words are stored in the buffer;

transferring data from the buffer to the memory across the memory bus at the speed of the second clock to complete the write operation with respect to the determined number of words located in the buffer while remaining data to be transferred pursuant to the operation is stored to the buffer;

wherein the remaining data of the operation continues to be temporarily stored in the buffer while the operation is completed with respect to the data stored in the buffer such that delay incurred by waiting for the data to be completely transferred to the processor prior to transferring the data to complete the operation is minimized.

9. The method as set forth in claim 8, wherein said step of detecting is performed in accordance with the second clock.

10. The method as set forth in claim 8, wherein said step of transferring data from the buffer to the memory across the memory bus comprises the steps of:

issuing a memory write signal for the determined number of words located in the buffer;

communicating the determined number of words across the memory bus to the memory; and writing the words into memory.

11. The method as set forth in claim 8, said method further comprising the steps of:

determining address alignment of data to be transferred between the external device and memory;

adjusting the determined number of words in accordance with the address alignment determined.

12. The method as set forth in claim 8, wherein data is transferred across the external bus in blocks of eight words, one word transferred per clock cycle, said step of detecting a determined number of words detects when two words are stored in the buffer;

wherein data is transferred to memory as the data is received across the external bus such that only two words are transferred to memory after transfer across the external bus is complete.

13. In a system comprising a processor coupled to an external bus, and an external device coupled to the external bus, an method for transferring data between the external device across the external bus and main memory coupled to the processor by a high speed memory bus, said communication pursuant to a read operation to be performed, said external bus operating at a first clock speed and said memory bus operating at a second clock speed faster than the first clock speed of the external bus, said method comprising the steps of:

transferring data from the memory to be read by the external device across the memory bus at the speed of the second clock;

temporarily storing data transferred front the memory, said data stored in a buffer in accordance with the speed of the second clock;

detecting a determined number of words are stored in the buffer;

transferring data front the buffer to the external device across the external bus, to complete the read operation with respect to the determined number of words located in the buffer while the remaining data to be transferred pursuant to the operation is stored to the buffer;

wherein the remaining data of the operation continues to be temporarily stored in the buffer while the operation is completed with respect to the data stored in the buffer such that delay incurred by waiting for the data to be completely transferred to the processor prior to transferring the data to complete the operation is minimized.

14. The method as set forth in claim 13, wherein said step of detecting is performed in accordance with the second clock.

15. The method as set forth in claim 13, wherein said step of transferring data from the buffer to the external device across the external bus comprises the steps of:

transferring the determined number of words stored in the buffer to an input/output buffer coupled to the external bus;

communicating the determined number of words across the external bus from the input/output buffer at the next occurrence of the first clock; and latching the words at the external device from the external bus.

16. The method as set forth in claim 13, said method further comprising the steps of:

determining address alignment of data to be transferred between the external device and memory;

adjusting the determined number of words in accordance with the address alignment determined.

17. The method as set forth in claim 13, wherein data is transferred across the external bus in blocks of eight words, one word transferred per clock cycle, said step of detecting a determined number of words detects when two words are stored in the buffer.

* * * * *